US000002032H

(19) United States

(12) Statutory Invention Registration

DiPietro, Jr.

(10) Reg. No.: US H2032 H

(43) Published: Jul. 2, 2002

(54) INTEGRATED FAN-CORE TWIN SPOOL COUNTER-ROTATING TURBOFAN GAS TURBINE ENGINE

(75) Inventor: Anthony L. DiPietro, Jr., Springboro, OH (US)

(73) Assignee: The United States of America as represented by the Secretary of the Air Force, Washington, DC (US)

(21) Appl. No.: 09/413,053

(22) Filed: Oct. 1, 1999

(51) Int. Cl.[7] ..... F02K 3/02

(52) U.S. Cl. ..... 60/226.1; 60/39.162

(58) Field of Search ..... 60/39.162, 226.1, 60/261

(56) References Cited

U.S. PATENT DOCUMENTS 3,463,421 A * 8/1969 Pyptuik ..... 60/226.1
4,790,133 A 12/1988 Stuart
4,860,537 A 8/1989 Taylor
4,947,642 A 8/1990 Grieb et al.
4,976,102 A * 12/1990 Taylor ..... 60/39.162
5,274,999 A * 1/1994 Rohra et al. ..... 60/226.1
5,694,767 A * 12/1997 Vdoviak et al. ..... 60/261
6,082,967 A * 7/2000 Loisy ..... 60/39.162

* cited by examiner

*Primary Examiner*—Harold J. Tudor

(74) *Attorney, Agent, or Firm*—Thomas L. Kundert; Bobby D. Scearce

(57) ABSTRACT

A twin spool counter-rotating turbofan gas turbine engine having a counter-rotating fan module integrated with the high pressure compressor and driven by a counter-rotating turbine utilizing only two drive shafts. The two drive shafts are aerodynamically coupled and rotate in opposite directions relative to each other with or without the use of a gearbox. The integration between the fan module and high pressure compressor allows the fan blade rows to operate at the same mechanical speed of the high pressure compressor blade rows. An afterburner module may be added to the present invention to provide thrust augmentation.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTEGRATED FAN-CORE TWIN SPOOL COUNTER-ROTATING TURBOFAN GAS TURBINE ENGINE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to structure and operation of gas turbine engines and more particularly to a twin spool counter-rotating turbofan gas turbine engine.

Counter-rotating turbomachinery technology is a superior approach for significant improvements in the aerodynamic performance and efficiency of axial flow fans, compressors and turbines while simultaneously reducing engine size, weight and number of parts. The development of more fuel efficient, reduced weight, reduced manufacturing and maintenance cost gas turbine engines for future aircraft will require the use of counter-rotating turbomachinery technology.

The principle behind counter-rotating turbomachinery technology is to perform or extract more work per unit length of turbomachines by replacing the stationary blade rows with fluid energy transferring counter-rotors. This provides the benefit of using fewer blade rows to obtain a particular pressure ratio, in the case of a compressor, or extract an increment of mechanical work in the case of a turbine. The advantages over a conventional design are significant improvements in the aerodynamic performance and efficiency of the fan, compressor and turbine modules while simultaneously reducing the module length, weight and number of parts. These component module advantages produce a gas turbine engine that overall has reduced length, reduced weight and is less expensive to manufacture and maintain due to a reduced part count.

Another advantage counter-rotating turbomachinery technology offers over conventional turbomachinery is the high relative blade velocities present between the rotors and counter-rotors at low rotor mechanical speeds. The high relative blade velocities present between the rotors implies that the rotors do not have to rotate as fast as a conventional transonic counterpart would require to obtain high stage loadings. Therefore, the centrifugal stresses on the rotor disk of a counter-rotating configuration are significantly lower, when compared to a conventional configuration counterpart and the disk life considerably extended. This has an enormous impact on the reduction of the manufacturing and maintenance costs associated with fan, compressor and turbine modules.

While the concept of counter-rotating turbomachinery technology is not new, application of this technology has been restricted to single stage fans, turbines, propellers and propfans due to the mechanical complexity of developing a multi-stage turbomachine with dual flow path turbofan cycle capability.

The prior art demonstrates high bypass ratio counter-rotating turbofan engines (U.S. Pat. Nos. 4,790,133, 4,860,537 and 4,947,642). However, all of these concepts are triple spool configurations requiring three drive shafts. The present invention solves or substantially reduces in critical importance problems in the prior art by providing a twin spool counter-rotating turbofan gas turbine engine structure with a counter-rotating fan and booster turbocompressor that integrates the fan module with the high-pressure compressor module by integrating one or more rotating blade rows within two or more counter-rotating blade rows and an integral fan rotor utilizing only two drive shafts.

The invention may find substantial commercial and military application in propulsion systems for jet propelled aircraft as well as land and sea vehicles.

OBJECTS OF THE INVENTION

It is a principal object of the invention to provide a twin spool counter-rotating turbofan gas turbine engine structure having the fan module integrated with the high-pressure compressor module driven by a counter-rotating turbine utilizing only two drive shafts.

It is another object of the invention to provide a twin spool counter-rotating turbofan gas turbine engine structure having a counter-rotating booster turbocompressor incorporated into one of the fan blade rows.

It is yet another object of the invention to provide a twin spool counter-rotating turbofan gas turbine engine structure having a counter-rotating booster turbocompressor incorporated into the entire fan model.

These and other objects of the invention will become apparent as a detailed description of representative embodiments proceeds.

SUMMARY OF THE INVENTION

The present invention is a twin spool counter-rotating turbofan gas turbine engine having a counter-rotating fan module integrated with the high pressure compressor and driven by a counter-rotating turbine utilizing only two drive shafts. The two drive shafts are aerodynamically coupled and rotate in opposite directions relative to each other without the use of a gearbox. The integration between the fan module and high pressure compressor allows the fan blade rows to operate at the same mechanical speed of the high pressure compressor blade rows. An afterburner module may be added to the present invention to provide thrust augmentation. Although the counter-rotating power turbine is described as a two-stage turbine it could comprise a plurality of stages. One alternative incorporates a counter-rotating booster turbocompressor into one fan blade row of the fan module and another alternative further incorporates a counter-rotating booster turbocompressor into the entire fan module, which are further integrated with the high-pressure compressor utilizing only two drive shafts. The critical components, which allow the counter-rotating booster turbocompressor to be incorporated into the fan blade rows, are the shrouds, which further splits the incoming air into a core stream and a fan stream.

DESCRIPTION OF THE DRAWINGS

The invention will be more clearly understood from the following detailed description of representative embodiments thereof read in conjunction with the accompanying drawings, wherein.

DETAILED DESCRIPTION

Figure 1:
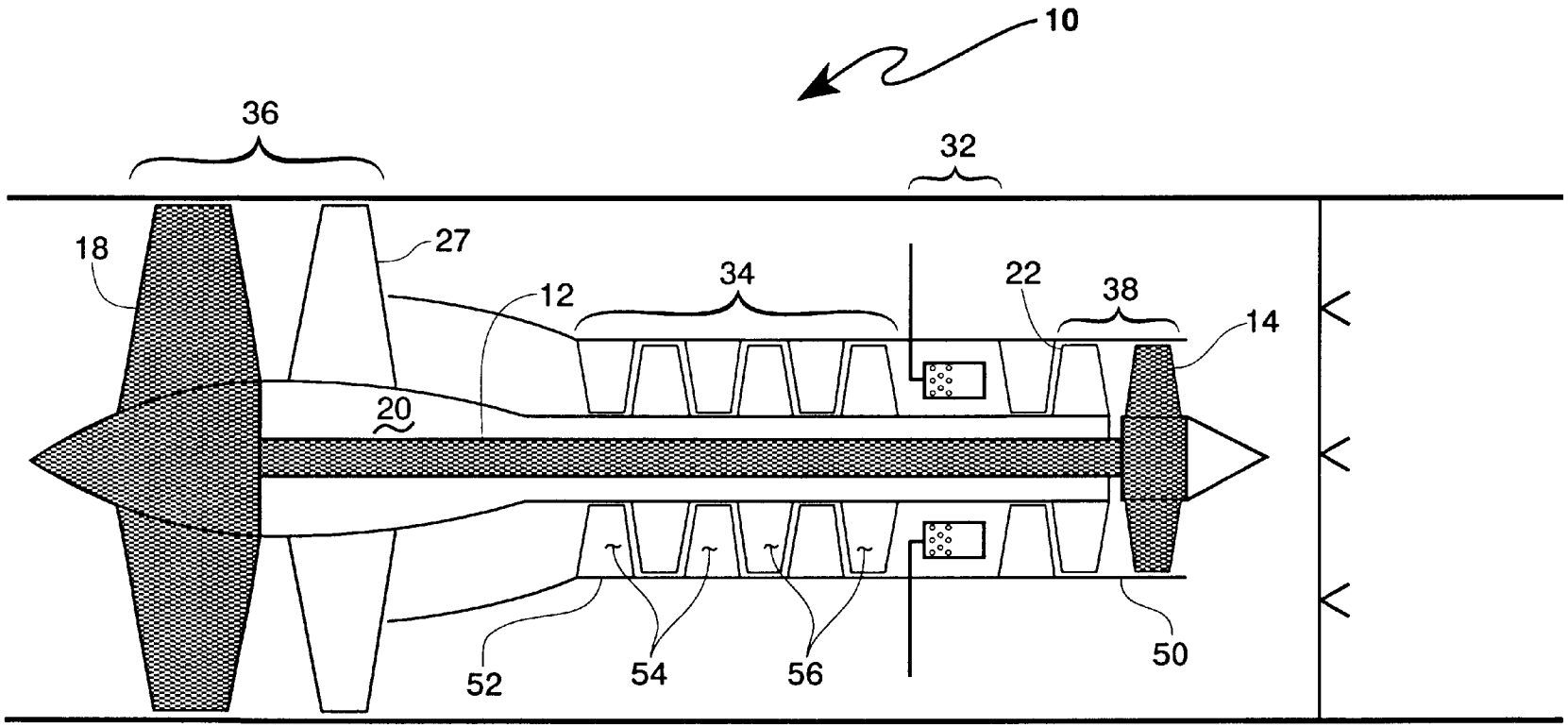
FIG. 1 shows a schematic cross section view of a twin spool counter-rotating turbofan gas turbine engine in accordance with an embodiment of the present invention.

Referring now to the drawings, FIG. 1 shows a schematic axial section view of a twin spool counter-rotating turbofan gas turbine engine 10 for application to a jet propelled aircraft or other turbomachinery applications. Turbine engine 10 comprises a combustion chamber 32, a counter-rotating turbine module 38 which may be either single or multiple stage, a counter-rotating fan module 36 and a high-pressure compressor module 34, all serially arranged along a centerline in an axial flow relationship. Turbine engine 10 has concentric drive shafts 12 and 20 which fixedly interconnect counter-rotating turbine module 38 with counter-rotating fan module 36. In addition to driving fan blade row 27 in the counter-rotating fan module 36, drive shaft 20 simultaneously drives a plurality of high-pressure compressor blade rows in high-pressure compressor module 34. Turbine engine 10 may or may not be equipped with an afterburner for thrust augmentation.

Pressurized air from high-pressure compressor module 34 is mixed with fuel in combustion chamber 32 and ignited, thereby generating combustion gases. Some energy is extracted from these gases by the counter-rotating turbine module 38.

Counter-rotating turbine module 38 is aft of combustion chamber 32 and includes counter rotatable turbine blade rows 14 and 22, which are capable of rotating concentric drive shafts 12 and 20. Each counter rotatable turbine blade rows 14 and 22 comprises a plurality of circumferentially spaced turbine blades. Turbine blade rows 14 and 22 extend radially outwardly to the turbine housing 50. Combustion gases flowing through turbine module 38 drive turbine blade rows 14 and 22 in counter-rotating directions.

Counter rotatable turbine blade rows 14 and 22 are fixedly attached and drive drive shafts 12 and 20. Concentric drive shafts 12 and 20 are coaxially disposed relative to the centerline of turbine engine 10 and extend forward through high-pressure compressor 34.

Counter-rotating fan module 36 is completely forward of combustion chamber 32. Fan module 36 includes fan blade row 18 connected to the forward end of drive shaft 12 and a fan blade row 27 axially spaced from fan blade row 18 and connected to the forward end of drive shaft 20. Each fan blade rows 18 and 27 comprise a plurality of circumferentially spaced fan blades. Fan blade rows 18 and 27 extend radially outwardly to the fan duct and are counter-rotating. Counter rotation is accomplished by driving fan blade row 27 in one direction with drive shaft 20, which also simultaneously drives the high pressure compressor blades of high-pressure compressor 34, which in turn is powered by turbine rotor 22, while driving fan blade row 18 in the opposite direction with drive shaft 12, which in turn is powered by turbine blade row 14.

High-pressure compressor 34 is axially positioned between combustion chamber 32 and counter-rotating fan module 36. High pressure compressor 34 includes a housing 52, a plurality of high pressure compressor stator rows 54 connected to the housing 52 and a plurality of high pressure compressor blade rows 56 connected to drive shaft 20, such that the turbine blade rows 14 and 22, respectively drive fan blade rows 18 and 27 and the drive shaft 20 simultaneously drives said plurality of high pressure compressor blade rows 56. The plurality of high-pressure compressor stator rows 54 connected to the housing extend radially inwardly to drive shaft 20. The plurality of high-pressure compressor blade rows 56 connected to drive shaft 20 extend radially outwardly to housing 52. Each of the high pressure compressor blade rows 56 and high pressure compressor stator rows 54 comprises a plurality of circumferentially spaced high pressure compressor blades and high pressure compressor stators, respectively.

Figure 2:
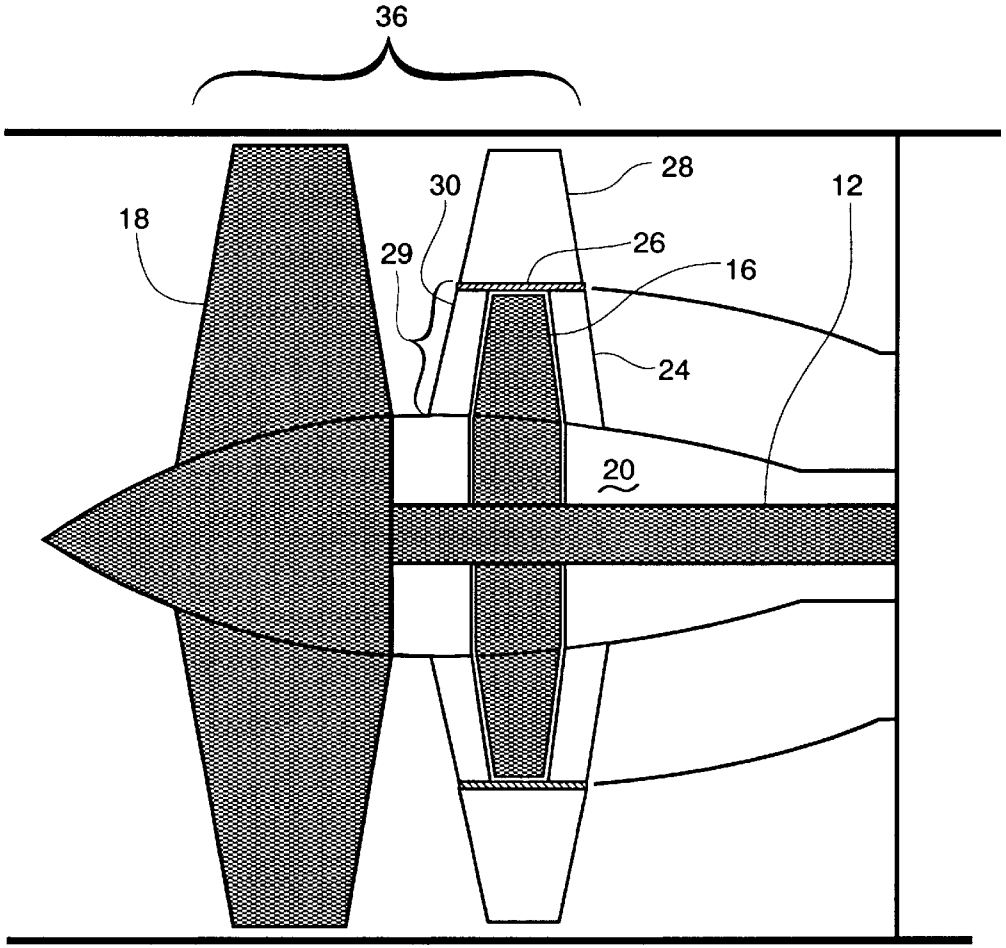
FIG. 2 shows a portion of an alternative twin spool counter-rotating turbofan gas turbine engine and depicts details of the integrated fan core counter-rotating booster turbocompressor more clearly.

FIG. 2 shows a schematic axial section view of an alternative embodiment of counter-rotating fan module 36, wherein a counter-rotating booster turbocompressor 29 is integrated into the counter-rotating fan module 36. Booster turbocompressor 29 comprises booster turbocompressor blade rows 30 and 24 connected at their hubs to drive shaft 20 and connected at their outer circumferences to shroud 26 disposed coaxially about the centerline of engine 10 and radially outwardly of drive shafts 12 and 20. Fan blade row 28 attaches to shroud 26 radially outwards of shroud 26. Fan blade row 28 comprise a plurality of circumferentially spaced fan blades. Fan blade row 28 extends radially outwardly to the fan duct. Fan blade rows 18 and 28 are counter-rotating. Each of booster turbocompressor blade rows 30 and 24 comprises a plurality of circumferentially spaced booster turbocompressor blades. Booster turbocompressor blade row 16 is axially spaced between booster turbocompressor blade rows 30 and 24 and connected to drive shaft 12. Booster turbocompressor blade row 16 comprises a plurality of circumferentially spaced booster turbocompressor blades. Booster turbocompressor blade row 16 rotates counter to booster turbocompressor blade rows 30 and 24. The two drive shafts 12 and 20 are aerodynamically coupled and rotate in opposite directions relative to each other without the use of a gearbox.

Shroud 26 is critical to the concept for allowing counter rotation to occur simultaneously between multiple blade rows within a portion of high pressure compressor 34 and fan module 36 utilizing only two drive shafts 12 and 20. Shroud 26 creates a hollow drum housing that encloses booster turbocompressor module 29 and provides an attachment point for the high-speed fan rotor 28 while simultaneously sub-dividing the main flow path into two different flow paths as shown in FIG. 2. Shroud 26 integrates the fan and high-pressure compressor modules 36 and 34 together and allows the two drive shafts 12 and 20 to rotate in opposite directions relative to each other causing each blade row in fan module 36, booster turbocompressor 29 and turbine modules 38 to counter-rotate relative to each other. This ability in conjunction with the shroud 26 allows the fan module and the high-pressure compressor 34 to be integrated and operate at the same mechanical speed utilizing only two drive shafts 12 and 20.

Figure 3:
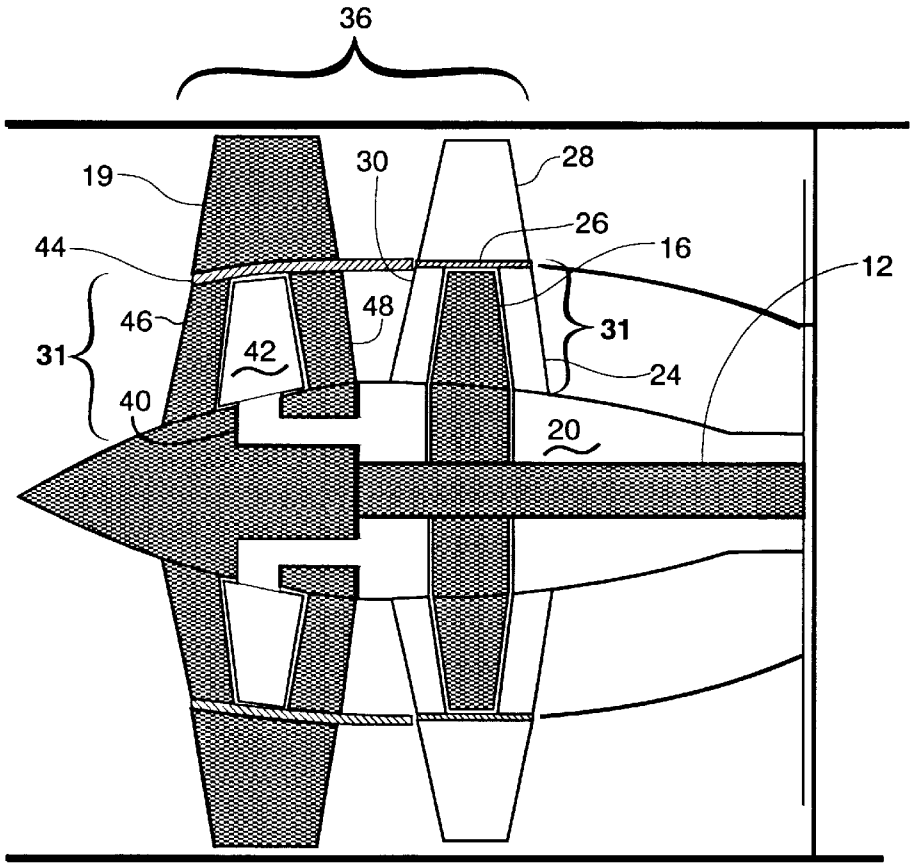
FIG. 3 shows a portion of another alternative twin spool counter-rotating turbofan gas turbine engine further having the entire fan module integrated with the high-pressure compressor module in the form of a counter-rotating booster turbocompressor in accordance with another embodiment of the present invention.

FIG. 3 is a third embodiment of fan module 36 that further integrates the entire fan module 36 with high-pressure compressor module 34 in the form of a counter-rotating booster turbocompressor 31 with additional counter-rotating blade rows within the integrated fan core. This is accomplished by connecting the hub of booster compressor blade row 42 to drive shaft 40 as shown in FIG. 3. Drive shaft 40 is an extension of the drive shaft 20. A booster turbocompressor shroud 44, similar to shroud 26, attaches to the tips of booster turbocompressor blade rows 46 and 48 and further integrates the core along with fan blade row 19. This configures a compression system consisting of a fan-integrated counter-rotating six-rotor high-pressure booster turbocompressor module composed of booster turbocompressor blade rows 46, 42, 48, 30, 16 and 24 and a twin rotor counter-rotating high-speed fan module composed of fan blade rows 19 and 28. The complete compression system remains driven by only two drive shafts and a twin rotor counter-rotating turbine module 38.

A unique feature of this variation of the disclosed concept is the integration of one or more rotating booster turbocompressor blade rows 42 and 16 within two or more counter-rotating booster turbocompressor blade rows 46 and 48, and 30 and 24, respectively, and the integrated counter-rotating fan blade rows 19 and 28 with high pressure compressor 34.

The invention therefore provides a novel gas turbine engine structure characterized by a counter-rotating fan module integrated with the high pressure compressor and powered by a counter-rotating turbine module utilizing only two drive shafts. In another embodiment of the invention a fan blade row incorporates a booster turbocompressor. In yet another embodiment the entire fan module incorporates a booster turbocompressor.

It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

What is claimed:

1. A gas turbine engine, comprising:

(a) a combustion chamber;

(b) a counter-rotating turbine, completely aft of said combustion chamber, including first and second counter rotatable turbine blade rows capable of rotating first and second concentric drive shafts; respectively, (c) a counter-rotating fan module completely forward of said combustion chamber including a first fan blade row connected to said first drive shaft and a second fan blade row axially spaced from said first fan blade row and connected to said second drive shaft; and, (d) a compressor axially positioned between said combustion chamber and said counter-rotating fan module, said compressor including a housing, a plurality of compressor stator rows connected to the housing, and a plurality compressor blade rows connected to said second drive shaft such that the first and second turbine blade row respectively drive a fan blade row and the second drive shaft simultaneously drives said plurality of compressor blade rows.

2. A gas turbine engine according to claim 1, wherein said first and second concentric drive shafts are aerodynamically coupled and rotate in opposite directions relative to each other.

3. A gas turbine engine according to claim 2, further comprising an afterburner module is connected completely aft of said counter-rotating turbine.

4. A gas turbine engine according to claim 2, wherein said counter-rotating turbine further comprises a plurality of first and second counter rotatable turbine blade rows for rotating said first and second concentric drive shafts.

5. A gas turbine engine according to claim 3, wherein said counter-rotating turbine further comprises a plurality of first and second counter rotatable turbine blade rows for rotating said first and second concentric drive shafts.

* * * * *